May 23, 1967          A. J. DI STASI          3,321,158
RETRACTILE AND COLLAPSIBLE FLOATS FOR AIRCRAFT
Filed July 26, 1965          5 Sheets-Sheet 1
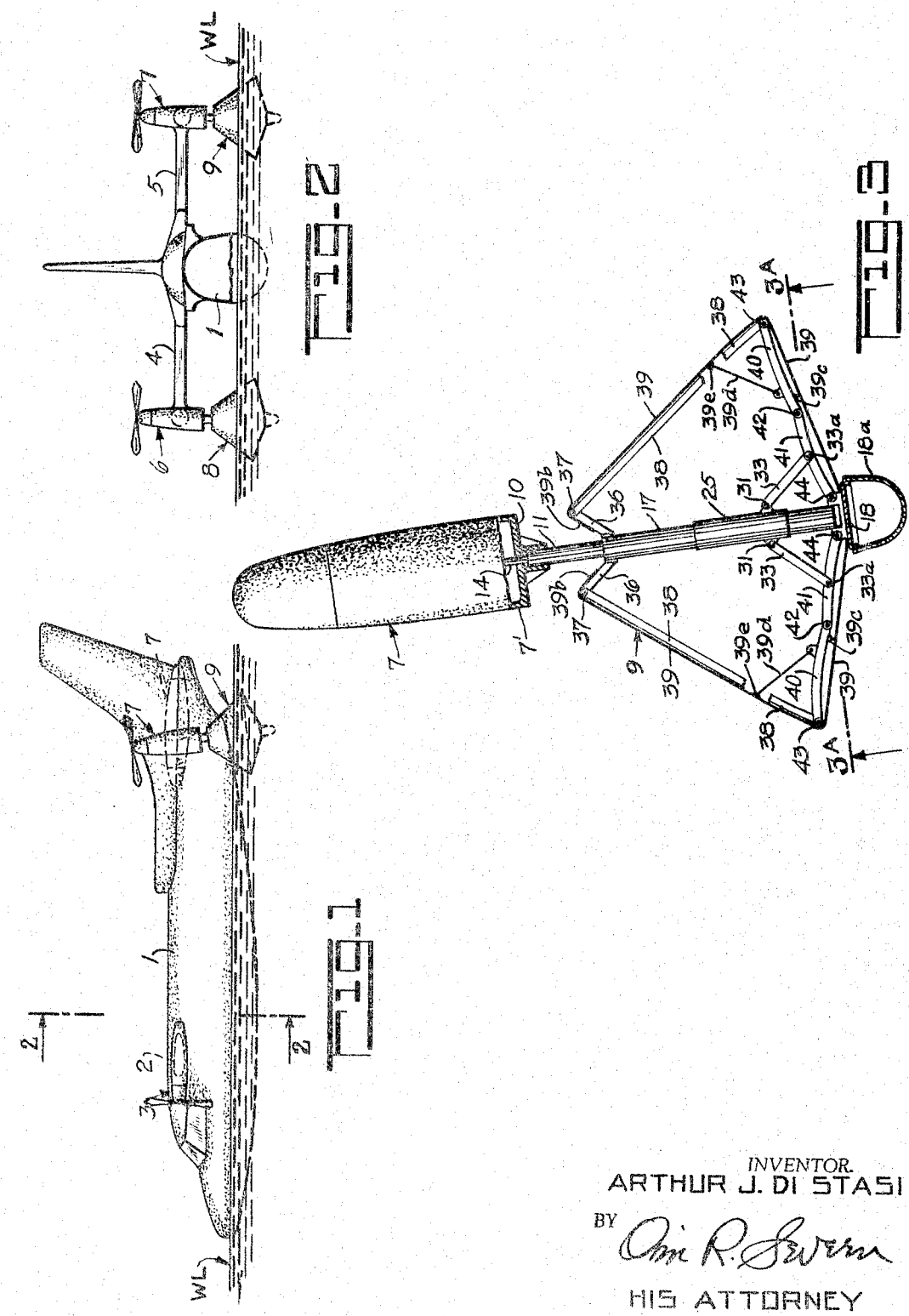
INVENTOR.
ARTHUR J. DI STASI
BY
HIS ATTORNEY

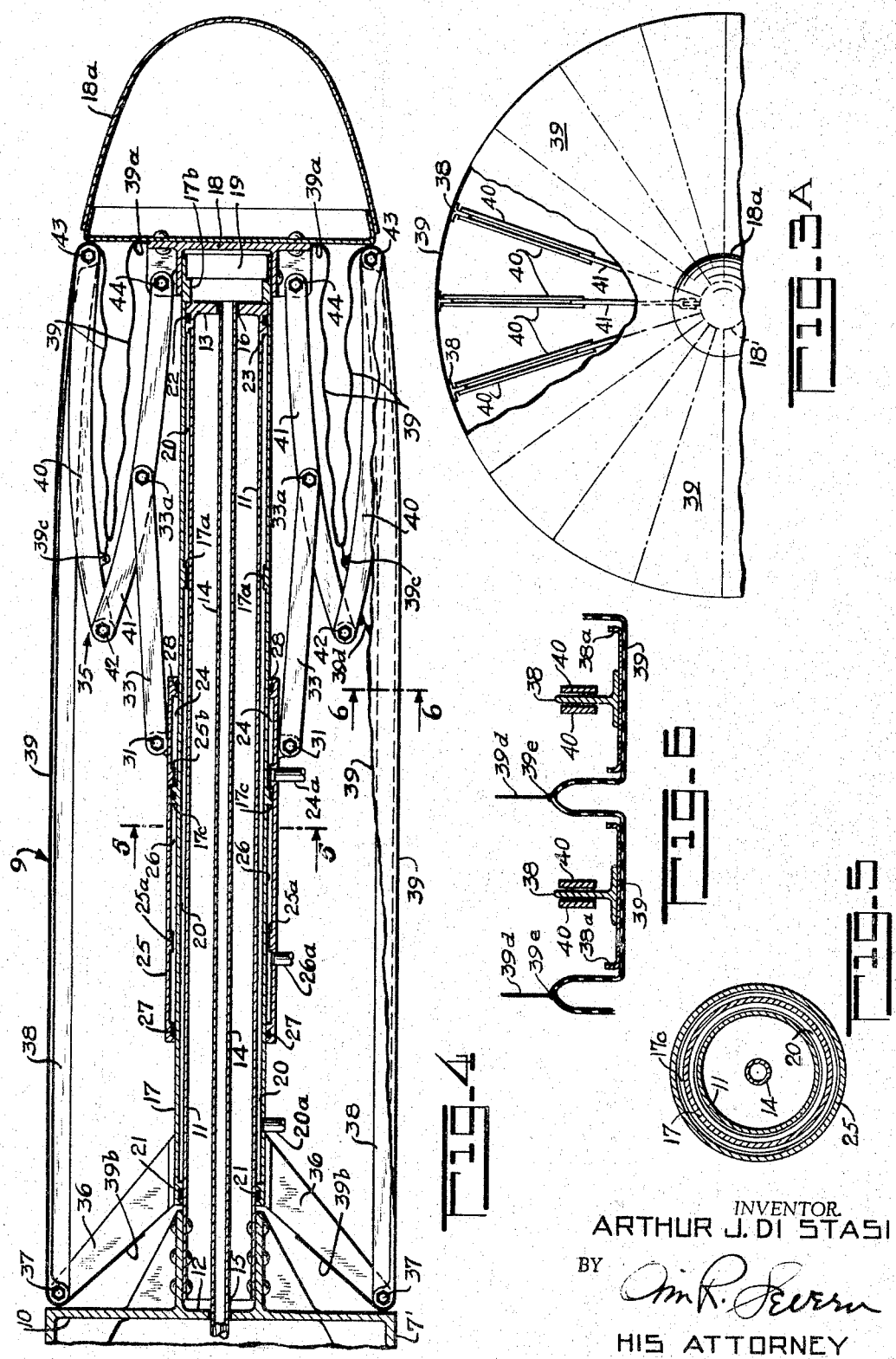

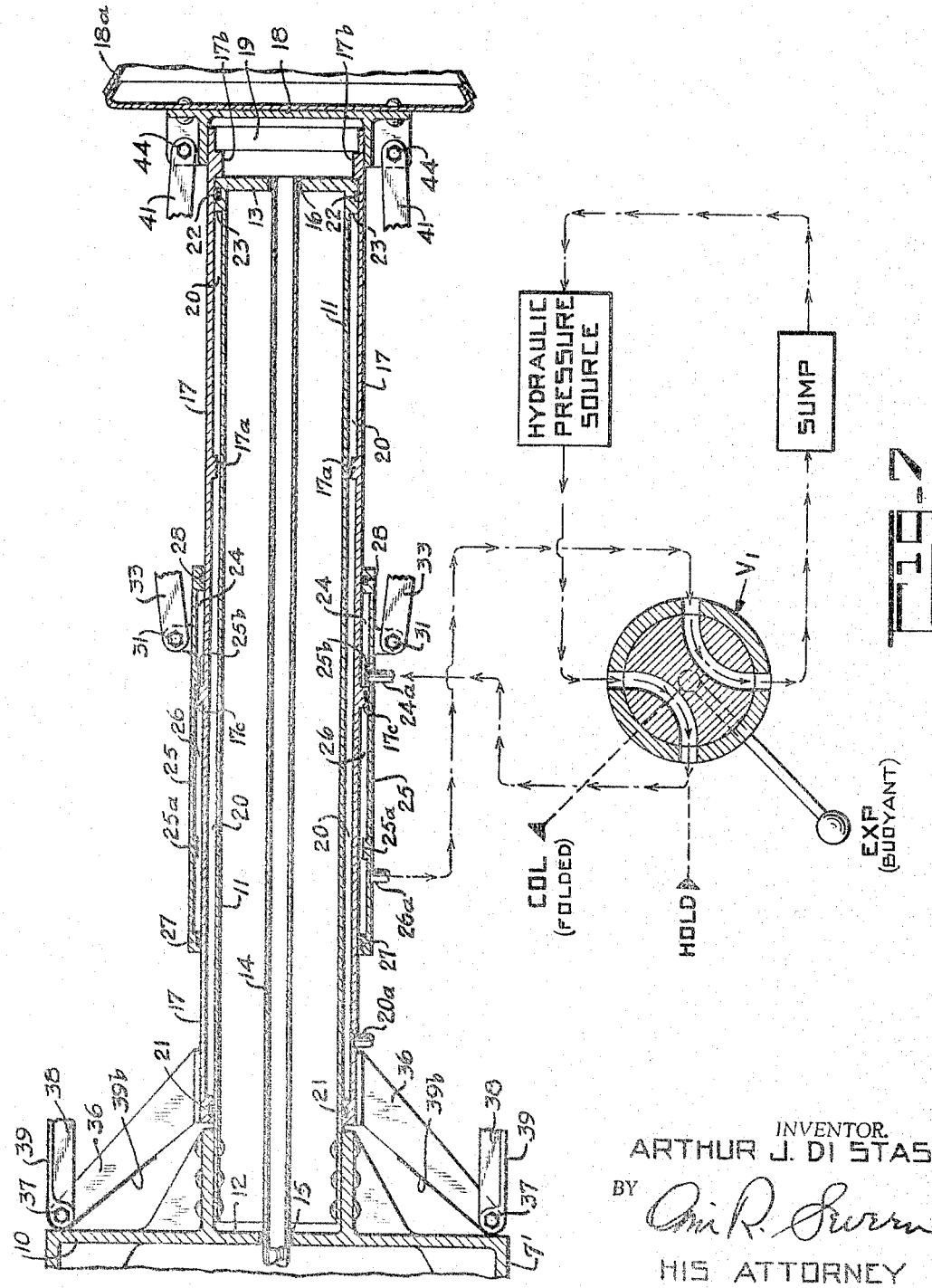

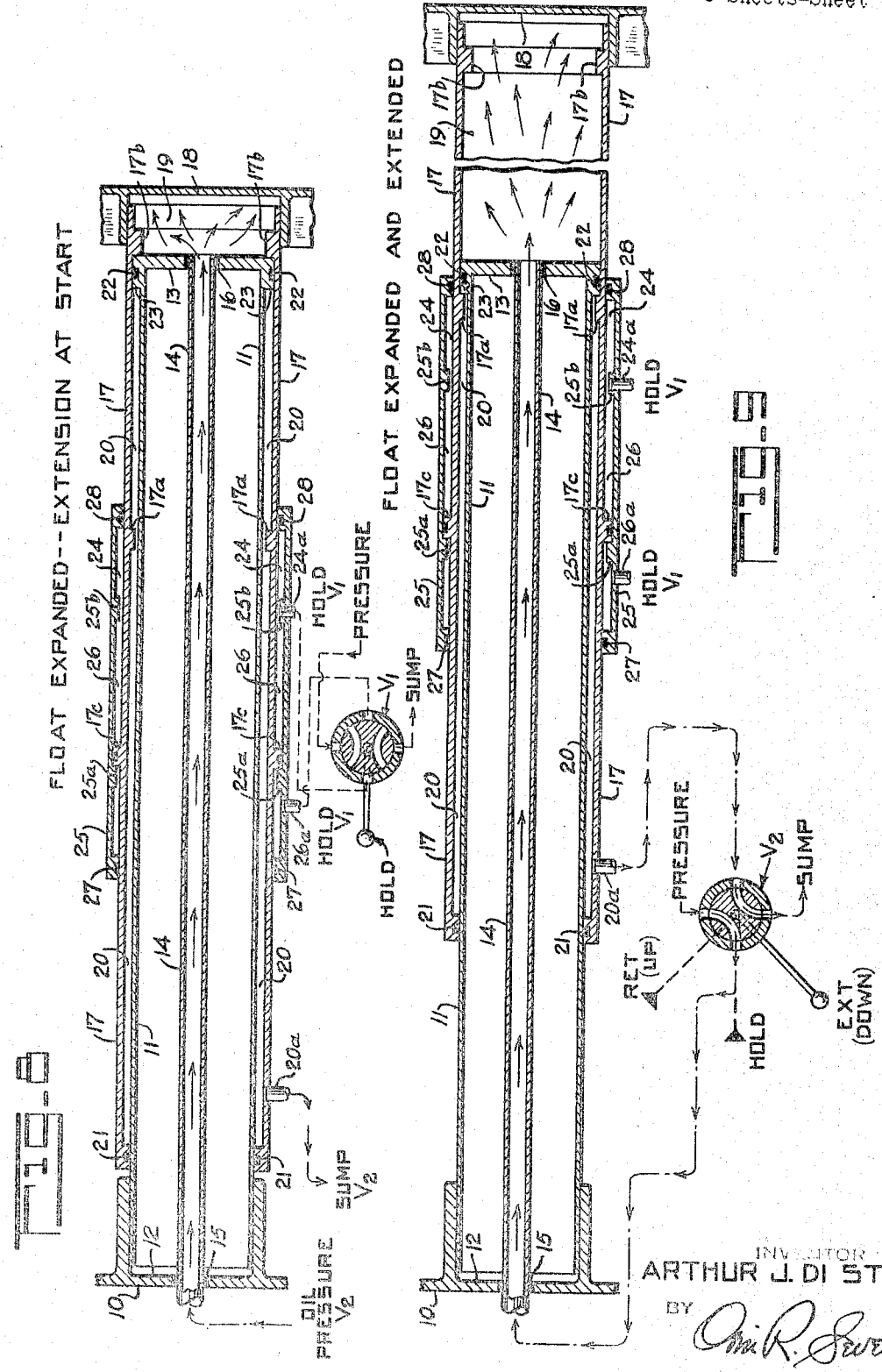

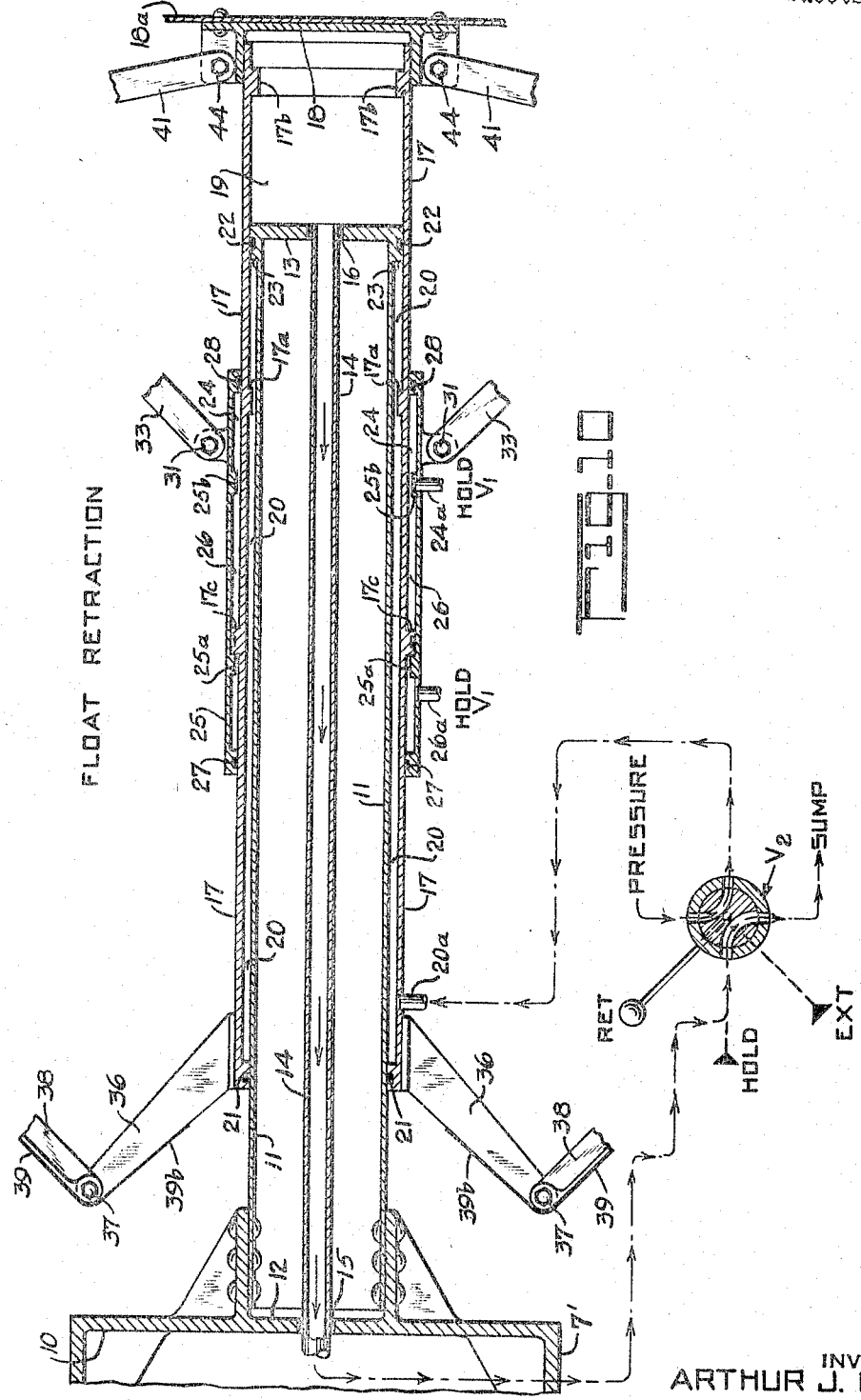

United States Patent Office 3,321,158
Patented May 23, 1967

3,321,158
RETRACTILE AND COLLAPSIBLE FLOATS
FOR AIRCRAFT
Arthur J. Di Stasi, Brookside, N.J., assignor to Curtiss-
Wright Corporation, a corporation of Delaware
Filed July 26, 1965, Ser. No. 474,772
12 Claims. (Cl. 244—106)

This invention relates generally to floats for water-based and amphibious aircraft, and in particular to extendible and retractable floats of the collapsible type that are especially useful for "VTOL" (vertical take-off and landing) aircraft.

In one form of VTOL aircraft, a nacelle for power transmission or thrust equipment is mounted for pivotal movement at each side and outboard of the aircraft fuselage so that the fore-and-aft, or longitudinal, axis of the nacelle can be tilted to correspond generally with the desired direction of flight. For the purposes of the present invention, a "nacelle" means an enclosing cover or shell for aircraft thrust or power equipment, an airfoil, or in fact any similar structure that is suitably mounted at opposite sides and outboard of the fuselage, and that in practice is aligned generally with desired flight direction.

A characteristic common to VTOL aircraft having nacelles aligned according to flight direction is that when the aircraft is taking off or landing, or in its static (landed) state, each nacelle is positioned with its longitudinal axis generally vertical. Where the nacelle has material length, the lower end thereof in this position may be but a short distance above the surface of the landing area.

According to the present invention, this characteristic is used to advantage in stabilizing and partially supporting VTOL aircraft when water-borne. To this end, a nacelle at each side of the fuselage carries a float that when extended and expanded to buoyant state, acts as a pontoon for laterally stabilizing and supporting in part the aircraft when water-borne, and that when retracted and collapsed constitutes a compact, streamlined extension of the nacelle trailing end during flight; also, each float can be extended or retracted as desired for adjusting the attitude of the longitudinal or X axis of the aircraft for leveling purposes incident to shift of C.G. (center of gravity).

A principal object therefore of the invention is to provide a new and improved extendible-expandable, and retractable-collapsible float, and operating means therefor uniquely suited for mounting the float on a nacelle or equivalent support of VTOL aircraft.

Another object of the invention is improved float structure for VTOL aircraft, having adjustable extension and retraction control that lends itself to simplified and efficient practical use, both for compensation of shift of C.G. and improved stabilization of the aircraft when water-borne, and also for compatibility with the aerodynamic configuration of the nacelle when the aircraft is in flight.

Another and more specific object of the invention is an improved, compact and lightweight float construction using telescopic operating parts in combination with an operating linkage and enclosing waterproof skin that constitutes a vertically adjustable, extended buoyant float compartment when in use, and a comparatively small diameter streamlined accessory on the aft portion of the nacelle when in retracted-collapsed condition during flight.

The invention will be more fully set forth in the following description referring to the accompanying drawings, and the features of novelty will be pointed out with particularity in the claims annexed to and forming a part of this specification.

Referring to the drawings:

FIG. 1 is a side view of a VTOL aircraft shown water-borne, and having nacelle floats embodying the present invention;

FIG. 2 is a view taken along the line 2—2 of FIG. 1 looking toward the rear of the aircraft showing the outboard positioned floats extended and expanded;

FIG. 3 is an enlarged and more detailed view of the nacelle and float structures of FIG. 1;

FIG. 3A is an enlarged end view of the expanded float taken along the line 3A—3A of FIG. 3, indicating the radial spoke positions of the expansion linkage;

FIG. 4 is an enlarged detail view of the actuator and float structures of FIG. 3 when retracted and collapsed, in relation to the nacelle;

FIG. 5 is an enlarged cross sectional view of the actuator cylinders taken along the line 5—5 of FIG. 4;

FIG. 6 is an enlargement of the detail cross section taken along the line 6—6 of FIG. 4, indicating the form-defining spokes for the float skin;

FIG. 7 is a view of the float actuator structure of FIG. 4, enlarged to illustrate hydraulic float operation at the beginning of a control cycle;

FIG. 8 is a similar view for illustrating the float expansion operation prior to extension;

FIG. 9 is a similar view indicating that the float is fully expanded and extended; and FIG. 10 is a view similar to FIG. 9 showing the float retraction and/or vertical adjustment, the float remaining expanded.

A VTOL aircraft for amphibious use to which the invention may be applied is shown by way of example in FIGS. 1 and 2. The aircraft fuselage 1 is designed to be water-borne and in the example shown is provided with dual stub wings, or outboard supports, laterally located fore and aft, respectively, on the fuselage. The forward stub wings, one of which is indicated at its chord section in dotted line at 2, FIG. 1, carry power equipment nacelles 3 at their outer ends, respectively. Similar nacelles 6 and 7 are carried at the outer ends of the aft supports 4 and 5, FIG. 2. Each nacelle in the example shown carries at its forward end a propeller, and is pivotally mounted on its supporting stub wing so that its fore-and-aft axis can be tilted to correspond with the direction of desired flight. The propeller is connected by power transmitting means through the nacelle to a prime mover or movers (not shown) within the fuselage. For further description of this type aircraft, reference is made to Patent No. 3,181,810 granted to Norman C. Olson, May 4, 1965, for "Attitude Control System for VTOL Aircraft."

In accordance with this invention, the aft nacelles 6 and 7 serve as mounts or supports for the floats 8 and 9 respectively, shown extended and buoyant in FIGS. 1 and 2. These two aft-positioned floats provide a dual function, as clearly shown in FIGS. 1 and 2; namely, (1) compensation for shift in C.G. of the aircraft (as to both its longitudinal and transverse axes) by individual adjustment of the extension distance of each float, and (2) improved lateral stability when the aircraft is water-borne.

Referring now to FIG. 4, the float 9, for example, is shown in retracted, collapsed condition at the trailing end 7' of the aft nacelle 7. A rugged bracket or support pad 10 is suitably mounted on the nacelle trailing end for supporting and carrying the float proper, which includes a fixed actuator guide cylinder 11 in alignment with the longitudinal axis of the nacelle. The cylinder at its opposite ends is sealed by the walls 12 and 13 respectively, and a fixed hydraulic fluid line 14 from the nacelle extends within and along the central axis of the cylinder from a supply source (not shown) through both the end walls in sealed relation thereto at 15 and 16.

The cylinder 11 constitutes a fixed guide for reciprocal or "trombone" movement thereon of a larger diameter cylinder or tube 17 that is closed at its outer end by a wall 18. At both ends, the cylinder is mechanically connected to the float proper, as presently described, for extension and retraction thereof, in combination with appropriate linkage. As shown in FIG. 4, the cylinder end wall 18 is spaced a short distance from the guide tube wall 13 in the retracted, collapsed position of the float for defining an expansion, or variable volume fluid chamber 19 communicating with the fluid line opening at 16. The "trombone cylinder" 17 is spaced concentrically with respect to the guide tube 11 to form therewith also a variable volume annular fluid chamber 20. This chamber is connected by a passage 20a through the trombone tube 17 to a hydraulic control line, as indicated.

The chamber 20 is fluid sealed at its opposite ends by two sliding-fit oil seals 21 and 22, respectively. The seal 21 is secured to the trombone cylinder at its inner side, and the seal 22 is secured to the fixed tube 11 at its outer side. Considering the variable volume chambers 19 and 20, it will be seen that relative telescopic movement of the two cylinders 17 and 11 causes concurrent increase of volume of one chamber and decrease of volume of the other. Limit stops for reciprocal movement of the trombone cylinder comprise an inner annular shoulder 17a of cylinder 17 that is spaced from the outer periphery of the guide tube to provide fluid clearance through the chamber 20, and a coating stop formed by the shoulder including the end seal 22 on the fixed guide tube. This limits the outward movement of the trombine cylinder. A stop for the retracted position is formed by an inner shoulder 17b on the trombone cylinder for abutting the end of the guide tube.

These fluid chambers are connected to a suitable hydraulic control system through reversible pressure and exhaust lines 14 and 20a, above. Accordingly, a pressure medium such as oil from line 14, for example, act on the movable chamber wall 18 of the chamber 19 for moving the cylinder 17 in piston manner toward the right, or float-extended position. As used herein, the term "oil" means any suitable hydraulic medium, such as that generally used in aircraft hydraulic systems.

The float operating mechanism, FIGS. 4 and 7, includes a guide sleeve 25 concentrically mounted on and spaced from the trombone cylinder 17 to form therewith annular operating chambers 24 and 26. The sleeve carries at opposite ends oil seals 27 and 28 for making a sliding-fit with the trombone cylinder, and also form with the cylinder seal 17c a partition defining the two sleeve chambers 24 and 26, above. The chamber 24 communicates at port 24a, and the chamber 26 at port 26a, with the hydraulic control system. Sliding movement of the sleeve on the cylinder 17 toward the right is limited by an annular shoulder stop 25a on the inner side of the sleeve that can abut the seal stop 17c, and movement to the left is limited by a similar stop 25b (at the port 24a) that can abut the opposite side of the seal stop 17c. The sleeve 25 is mechanically connected around its outer periphery at spaced points indicated at 31 to a suitable number of the float linkage parts 33.

Summarizing briefly the actuator description above, the three concentrically mounted cylindrical parts 11, 17 and 25 constitute the basic actuator structure for the float linkage, the part 11 constituting a fixed guide and the parts 17 and 25 being individually operable and relatively movable with respect to each other and to the fixed guide. The basic actuator and the float linkage generally indicated at 35 together function somewhat like an umbrella for expanding and collapsing the float; superimposed on this operation is the separate extension and retraction float control, referred to above.

The float linkage is shown in its fully expanded position in FIGS. 3 and 3A, and in its fully collapsed position in FIG. 4. The trombone cylinder 17 is shown fully extended in FIG. 3, although this need not always be the case, as where the float is subject to vertical adjustment. As best shown above, the trombone cylinder, which in turn carries the slidable sleeve 24, supports for bodily movement the complete float including the linkage 35 and covering float skin 39. The float skin or covering may be composed of any durable, flexible material, as a suitable plastic-coated fabric or rubber.

The float skin 39 is peripherally sealed at opposite ends of the float with respect to the ends of the trombone cylinder 17, specifically at 39a to the outer end wall structure of the cylinder by cement or the like, for sealing the float compartment bottom, and also at 39b to the cylinder end nearest the nacelle so as essentially to cover the spaced struts 36, except of course, for an adequate pressure equalizing atmospheric vent opening at the top of the float compartment.

Referring to FIGS. 3 and 4, cylinder 17 at its nacelle end rigidly carries at its periphery a plurality of radially extending brackets 36. Each is pivotally connected at 37 to one end of a link or spoke 38 for supporting the float skin 39 and defining the periphery of the float, both expanded and contracted. A toggle-type linkage 40, 41 having a knee-joint 42 interconnects the other end of each spoke at 43 and the outer end 18 of the trombone cylinder at 44. The toggle is straightened or buckled by thrust or tension, respectively, applied by the sleeve link 33 that is connected to the link 41 at 33a, so as to control the toggle according to direction of sleeve movement. With all the radially positioned toggles straightened when the sleeve 25 is at its outer limit on cylinder 17, the spokes 38 are expanded in umbrella fashion to stretch and hold extended the float skin surrounding the spokes. Accordingly, the float spokes and skin together form a buoyant compartment resembling a frusto-cone. The spokes 38 have a T-section form for rigiidty, FIG. 6, with an additional widened flange 38a for increased skin area contact. The skin may be cemented to each flange.

In the collapsed float position, FIG. 4, the sleeve 25 is retracted and each link 33 holds its respective toggle buckled at the knee; thus, the toggles and connected spokes 38 are folded compactly along the trombone cylinder. In this collapsed position, the spokes and the enclosing float skin together have a compact configuration that is streamlined with the nacelle. The trailing end 18 of the trombone cylinder may include a rounded end cap 18a for completing the streamlining.

Folding the float skin into the streamline configuration described above is accomplished by folding portions of the bottom and side, respectively, into spaces between the collapsed linkages. Those portions at the bottom of the float opposite the toggles 40, 41, FIGS. 3 and 4, are flexibly tied at 39c to the radially positioned toggle links 40. This ensures proper folding of the bottom portions between the buckled toggles as the float is collapsed, FIG. 4.

As the side of the expanded float, FIG. 3, forms the major part of a cone, each skin portion between a pair of spokes 38 is roughly triangular, thereby requiring folding at the larger area near the base. This is conveniently done by attaching an elastic connection 39d between each toggle link 40 and the adjacent skin portion as indicated at 39e, FIG. 3, so as to draw the skin portion in between the spokes, FIG. 6, as they collapse. This ensures a streamlined surface of the collapsed float.

*Hydraulic control for float operation*

Vertical extension and retraction of each float when expanded and buoyant are in practice preferably under selective control of the pilot so that the extension of each float can, within limits, be independently adjusted; also, the expansion and collapse of the floats can be under control of the pilot, or be made automatic according to a predetermined distance between the float and its nacelle.

*Float expansion.*—FIG. 7 illustrates the float actuator mechanism in the collapsed-retracted position, as in FIG. 4, with schematic connections to a hydraulic system including suitable valve control. In FIG. 7 and subsequent figures illustrating the hydraulic control, the complete linkage and float structures are not shown, it being sufficient to indicate the mechanical connections thereto with reference to FIGS. 3 and 4. The actuator is shown here at the start of the float expansion operation, i.e., travel of the sleeve 25 toward the right as viewed, which takes place prior to bodily extension of the float toward its buoyant position.

The hydraulic system and valve control herein used for float expansion and collapse may be of conventional type and includes a 3-position, 4-way valve $V_1$ connected as indicated to the lines at the port 26a for chamber 26, and at the port 24a for chamber 24. A suitable valve for this use is commercially available as Part No. HT–585100–653, by Hydra Power Corporation.

For initiating float expansion, the valve $V_1$ is moved to its expand position, EXP, which directs oil pressure from SOURCE through the valve and sleeve port 24a to the chamber 24. The oil chamber 26 is vented at the port 26a through the valve to SUMP for oil return. The oil pressure in the sleeve chamber 24 acts between the relatively fixed trombone seal 17c and the sleeve end seal 28 to move the sleeve toward the right, thereby transmitting thrust through the links 33 for straightening the float toggles 40, 41 as previously described. As the chamber 24 is expanded during this operation, the other sleeve chamber 26 is contracted between the two seals 27 and 17c to force oil therefrom to SUMP by way of port 26a and valve $V_1$. The sleeve is stopped when its stop 25a engages the trombone seal stop 17c, at which time the toggles 40, 41 and connected spokes 38 are fully extended for "opening the umbrella," i.e., expanding the float to its buoyant condition. The valve $V_1$ is thereupon placed at HOLD, FIG. 8, for blocking flow of oil to or from the ports 24a and 26a, thereby hydraulically locking the sleeve in fixed position relative to the cylinder 17.

This position of the actuator is shown by FIG. 8 wherein the sleeve 25 has moved through its float expanding range while the trombone cylinder is held hydraulically locked in its retracted position by the fluid locking function of its separately actuated valve at HOLD.

Extension of the now expanded float is illustrated as initiated in FIG. 8 and completed in FIG. 9. As stated above, the sleeve 25 is hydraulically locked to the cylinder 17 by positioning of the valve $V_1$ at HOLD and blocking off the chambers 24 and 26. The separate extension valve $V_2$, FIG. 9, is now opened to position EXT for float extension so that oil pressure is admitted through the line 14 to chamber 19. The pressure acts against the wall 18 for moving in piston manner the cylinder 17 toward the right until its stop 17a abuts the fixed guide stop 23. The expanded float is also carried through this distance and is now lowered to the position indicated in FIG. 3. The valve $V_2$ is placed at HOLD for locking the float in its extended position until a further float operation is required.

Adjustment of the float to an intermediate position on the fixed guide 11 is illustrated by FIG. 10. Here, the sleeve 25 remains hydraulically locked at HOLD by valve $V_1$ with the float expanded, and the valve $V_2$ has been partially opened or "cracked" at the retract position, RET, for slow operation. At position RET the pressure line is connected with the port 20a of the trombone chamber 20 and the chamber 19 is connected to SUMP through the line 14. The reduced pressure in chamber 20 now acts between the fixed guide stop 23 at one end, and the trombone seal 21 at the opposite end slowly to move the cylinder 17 toward the left as viewed, thereby retracting the float. When the desired retraction adjustment is obtained, the valve $V_2$ is placed at HOLD and the float is hydraulically locked in this position.

Where complete retraction is called for, the valve is fully opened at RET until the cylinder movement toward the left is blocked by its limit stop 17b abutting the outer end wall 13 of the fixed guide 11, FIGS. 4 and 7. Float collapse is then obtained by placing valve $V_1$ at COL, which connects the pressure line to the rear chamber 26 of the sleeve 25 at port 26a, and the sump line to the forward chamber 24 at port 24a. The chamber pressure then acts between the relatively fixed cylindrical seal 17c and the sleeve seal 27 to move the sleeve toward the left until its stop 25b abuts the seal stop at 17c. In this position of the sleeve 25, the float toggles 40, 41 are buckled to the folded positions shown in FIG. 4. The float is now fully collapsed and retracted and the cycle described as initiated in FIG. 7 is completed.

In practice, the present invention is especially useful for stabilizing certain types of VTOL aircraft when waterborne, where fuselage configuration and inherent aft C.G. position together produce high positive moments. This can, if uncorrected, result in an unsafe, nose-high, longitudinal altitude; also, where the vertical position of C.G. is high the metacentric height may be below C.G., causing high roll-over moments incident to wave motion. Both problems above are effectively solved by the adjustable rear nacelle floats of this invention; first, by providing enough variable buoyancy to balance out the high positive moments for varying fore and aft C.G., and maintaining a desired level attitude and, secondly, by providing buoyancy in a high roll condition so as to raise the metacentric height well above C.G., thereby producing an unusually stable condition.

It should be understood that this invention is not limited to specific details of construction and arrangement thereof herein illustrated, and that changes and modifications may occur to one skilled in the art without departing from the spirit of the invention.

I claim:

1. In VTOL aircraft capable of landing on water and having at least two nacelles mounted respectively at opposite sides and laterally of the fuselage of said aircraft, the attitude of each nacelle being adjustable with respect to the fuselage for aligning the longitudinal axis of the nacelle with the desired flight direction whereby said axis extends in generally vertical direction during landing and take-off, an expansible and collapsible float carried at the aft end of laterally positioned nacelles comprising a flexible waterproof skin forming the outer surface of the float, and means subject to pilot control for expanding said skin to form a buoyant compartment and for extending the float downward from its supporting nacelle incident to a landing on water, said means also being subject to pilot control for retracting the float incident to take-off and for collapsing said compartment into a compact streamlined configuration substantially continuous with the nacelle and forming its trailing end during flight conditions.

2. An aircraft nacelle float as specified in claim 1 wherein the nacelle is elongated in the direction of flight and the means subject to pilot control includes an actuator mounted on the trailing end of said nacelle for extending and retracting the float along a line substantially continuous with the longitudinal axis of the nacelle.

3. An aircraft nacelle float as specified in claim 1 wherein the nacelles are pivotally mounted with respect to the fuselage at outboard positions, and the float extension and retraction means are individually adjustable for varying the distance between nacelle and float and thereby stabilizing the aircraft when water-borne, along both its longitudinal and transverse axes.

4. An aircraft nacelle float as specified in claim 2 wherein the actuator comprises concentric relatively movable cylinders, one of which is operably connected to float expansion and collapse means and the other to float extension and retraction means.

5. An aircraft nacelle float as specified in claim 4 wherein the actuator cylinders are radially spaced to form fluid chambers therebetween and selective application of hydraulic pressure to said chambers causes linear movement of the corresponding cylinder.

6. In an aircraft having a fuselage adapted to be water-borne, a pair of floats mounted respectively at opposite sides of and outboard with respect to said fuselage for lateral balance of the aircraft in its water-borne state, each float having a separate support that is carried by said fuselage exteriorly and at opposite sides thereof respectively, a servo motor mounted on said support constituting actuator means guided for linear reciprocation in direction toward and away from the support, extendable linkage mechanism connected to and carried by said actuator means and movable thereby between an extended and radially expanded position and a compactly collapsed, retracted position, and a flexible, waterproof skin folded around the linkage in said collapsed position and connected to said actuator means, said skin being radially expanded by the linkage in the extended and expanded position thereof to form therewith a buoyant compartment.

7. Aircraft float apparatus as specified in claim 6 wherein the support for the servo motor comprises a nacelle of the aircraft, said nacelle being pivotally mounted with respect to the fuselage and vertically positioned when the aircraft is water-borne, the float actuator means being movable in the direction of the longitudinal axis of the nacelle for extending and expanding the float.

8. Aircraft float apparatus as specified in claim 7 wherein the servo motor comprises at least three relatively movable telescopic members, one of which constitutes a guide fixed to said support, and the other two constitute movable actuator elements operable by a fluid pressure medium.

9. Aircraft float apparatus as specified in claim 8 wherein the fixed guide is a first telescopic member in alignment with the nacelle, a second telescopic member is slidable and restrained for limited reciprocal movement on said fixed guide, and a third telescopic member is slidable on and restrained for limited reciprocal movement on the second member, the float linkage being carried by the second member and also connected to the third member for causing, respectively, expansion of the float in accordance with independent linear movement of the third member on said second member, and bodily extension of the float in accordance with linear movement of the second and third members as a unit on the fixed guide.

10. Aircraft float apparatus as specified in claim 9 wherein the fixed guide is a tube connected at one end to the nacelle and having a central passage for pressure medium, the second member is a cylinder having a closed end for defining with said tube at its other end a first operating chamber subject to fluid pressure from the aforesaid passage, said cylinder being concentrically spaced from said tube and forming therewith a second operating chamber separately subject to fluid pressure, the float linkage being connected to the opposite ends of the cylinder, and the third member is a sleeve concentrically spaced from the cylinder and forming therebetween two separate operating chambers for alternate connection, respectively, to the pressure medium and to exhaust for moving said sleeve in either direction on said cylinder, said sleeve being connected to the linkage for causing expansion of the float to its buoyant state, and said cylinder carrying the float proper for extension toward water-borne position.

11. Aircraft float apparatus as specified in claim 10 wherein the sleeve carried by and separately movable on the cylinder is connected to a control link for expanding and collapsing, respectively, the float, and the cylinder movable reciprocally on the fixed guide bodily extends and retracts, respectively, the float, and wherein the sleeve and cylinder may be separately or concurrently moved for jointly expanding and extending the float for the water-borne condition and for jointly retracting and collapsing the float for the flight condition.

12. Aircraft float apparatus as specified in claim 10 wherein a hydraulic pressure medium is controlled for selective application to either one of the aforesaid sleeve chambers, respectively, for expanding or collapsing the float and wherein the pressure medium is selectively applied to the first and second cylinder chambers, respectively, for extending and retracting the float, and blocking the exhaust of the aforesaid chambers effects hydraulic locking of the corresponding telescopic members for desired fixed adjustment thereof.

References Cited by the Examiner

UNITED STATES PATENTS

| | | | |
|---|---|---|---|
| 2,306,269 | 12/1942 | King | 244—102 |
| 2,494,445 | 1/1950 | Moeller | 244—105 |
| 2,563,263 | 8/1951 | Nicholl | 244—102 |

MILTON BUCHLER, *Primary Examiner.*

P. E. SAUBERER, *Assistant Examiner.*